No. 725,162. PATENTED APR. 14, 1903.
J. J. SMITH.
FEED TROUGH.
APPLICATION FILED NOV. 19, 1902.
NO MODEL.
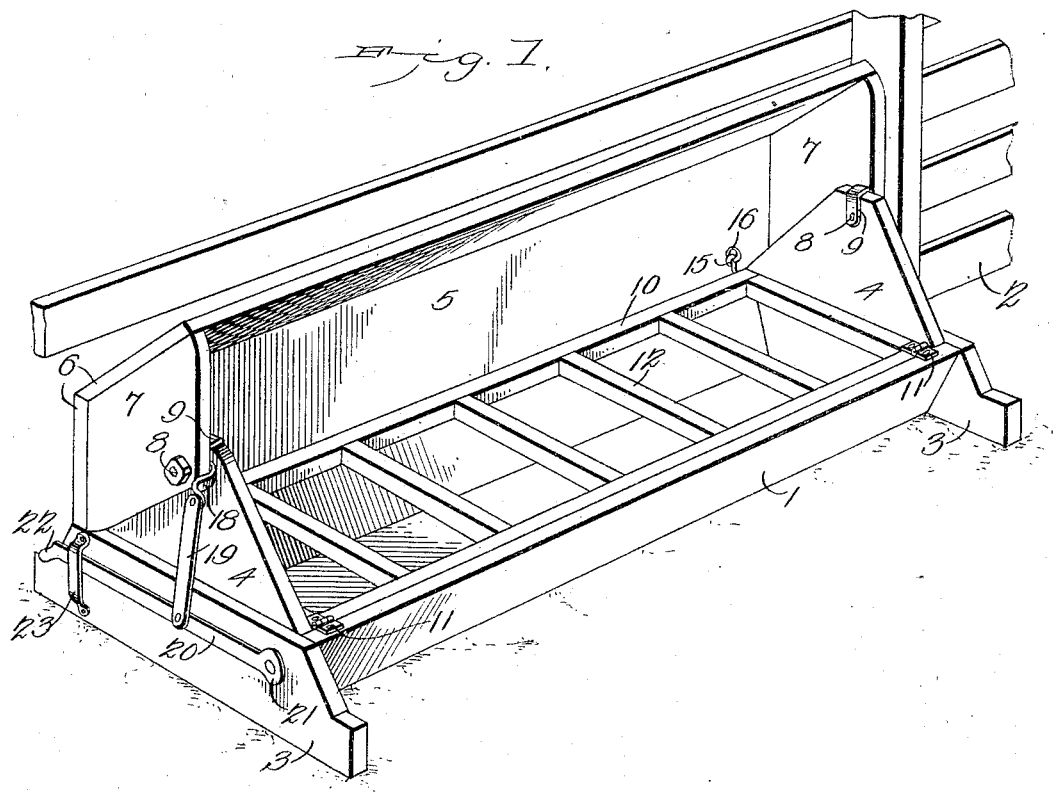
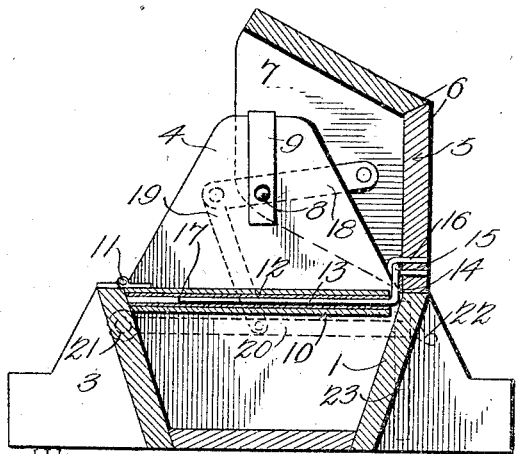
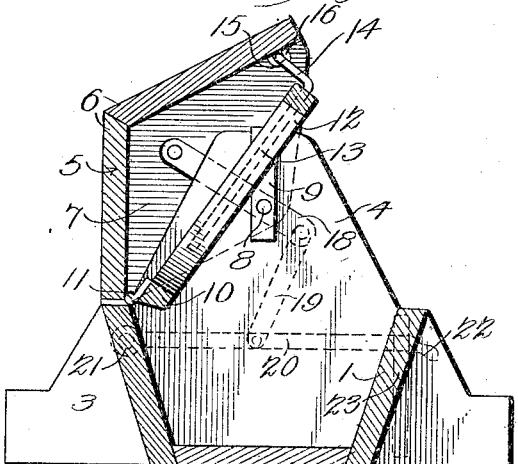
Witnesses
James J. Smith, Inventor.
Attorneys

UNITED STATES PATENT OFFICE.

JAMES J. SMITH, OF MARSHALL, OKLAHOMA TERRITORY.

FEED-TROUGH.

SPECIFICATION forming part of Letters Patent No. 725,162, dated April 14, 1903.

Application filed November 19, 1902. Serial No. 131,995. (No model.)

*To all whom it may concern:*

Be it known that I, JAMES J. SMITH, a citizen of the United States, residing at Marshall, in the county of Logan and Territory of Oklahoma, have invented a new and useful Feed-Trough, of which the following is a specification.

The invention relates to improvements in feed-troughs.

The object of the present invention is to improve the construction of feed-troughs and to provide a simple, inexpensive, and efficient one of great strength and durability adapted to save time and labor in feeding and watering stock and in cleaning it and capable of preventing the animals from wasting either feed or water or interfering with one another.

A further object of the invention is to provide a feed-trough designed to extend into a pen, inclosure, or the like and to form a permanent part of the same and adapted to be readily operated by the foot of a person to arrange it for preventing access to it by the stock and to afford ready access to it from the exterior of the pen or inclosure to enable it to be conveniently cleaned or supplied with feed or water without permitting the animals to interfere with the operator.

The invention consists in the construction and novel combination and arrangement of parts hereinafter fully described, illustrated in the accompanying drawings, and pointed out in the claims hereto appended.

In the drawings, Figure 1 is a perspective view of a feed-trough constructed in accordance with this invention and shown arranged for feeding or watering stock. Fig. 2 is a vertical sectional view of the same. Fig. 3 is a similar view, the pivoted shield being arranged for excluding animals from the trough.

Like numerals of reference designate corresponding parts in all the figures of the drawings.

1 designates a trough designed to be arranged in an opening of a fence 2 of a pen or inclosure and projecting inward and outward from the fence to afford access to it from the interior and exterior of the same. The trough is provided with suitable end sills or pieces 3 to provide a broad base, and they may be staked or otherwise secured to the ground or to the floor or the like, and the ends of the trough are provided with tapering extensions 4, forming approximately triangular upper portions for supporting a pivoted shield 5, which is adapted to be arranged at either side of the trough, as illustrated in Figs. 2 and 3 of the drawings, to permit animals to have access to the trough and to exclude them therefrom.

The shield 5 is approximately V-shaped in cross-section, being composed of sides 6 and end pieces 7, the end pieces 7 being approximately diamond-shaped, as shown, to fit the inner faces of the sides, which are arranged at an angle to each other. The end pieces 7 form projecting tapering portions, which are perforated for the reception of pivot-bolts 8, which also pass through perforations of the triangular extensions of the ends of the trough, and the latter are preferably reinforced by metal straps or pieces 9; but the parts may be pivoted together in any other desired manner. When the shield is at either side of the trough, the lower side board 6 is arranged in a vertical position from the adjacent side board of the trough, and the upper side board 6 of the shield inclines upward to a point directly beneath the adjacent portion of the fence or other inclosing wall. By this arrangement ample space is provided, and there is no liability of the heads of the animals coming in contact with the shield while feeding. More room is also afforded the operator in cleaning the trough or supplying feed or water to the same.

The feed-trough is provided with a frame or grating 10, connected with one side of the trough at the top thereof by hinges 11 and arranged in a horizontal position at the top of the trough, as illustrated in Figs. 1 and 2 of the drawings, when the feed-trough is arranged to permit animals to have access to it. The frame or grating 10 is composed of side bars and connecting transverse bars 12, forming spaces to permit the heads of animals to be introduced into the trough and adapted to prevent an animal from interfering with another or from throwing feed or water out of the trough. This frame or grating is slidably and hingedly connected with one side of the shield by means of rods 13, provided at their outer ends with arms 14, arranged at right angles to the rods and terminating in eyes 15, which are linked into eyes 16 of the inner face of one side of the shield. The rods telescope or slide in suitable openings of the end bars of the frame or grating, as clearly shown in Fig. 2. These openings, which terminate short of one side of the frame or grating, are provided with metal linings 17, preferably consisting of a tube or sheath. By this construction the rods are housed within the frame or grating and are protected from the weather, so that there is no liability of the parts freezing or becoming inoperative in cold weather. When the shield is swung over from the position shown in Fig. 2 to that illustrated in Fig 3, it carries with it the frame or grating, which is raised from a horizontal position to an inclined position to permit the operator to have free access to the trough.

One end of the shield is provided with an arm 18, consisting of a strap or bar secured to the inner face of the end 7 of the shield and having its lower end angularly bent to offset it from the trough. This arm is connected by a link or bar 19 with a lever 20, arranged in an approximately horizontal position and pivoted at its inner end 21 to the adjacent end sill of the trough and provided at its outer end with an enlargement or foot-piece 22, adapted to receive the foot of the operator, whereby the trough may be operated while the hands of the operator are free. By this construction it is unnecessary for the operator when carrying feed to the trough to set down the feed and operate the shield by hand; but the same may be operated by the foot. When the foot-lever is depressed, the shield is swung from one side to the other and its momentum will carry it beyond the center, and the operator by allowing his foot to remain on the treadle may resist the upward movement of the lever to cause the shield to be gently lowered to avoid injuring the trough or hurting an animal. The outer portion of the lever is arranged within a guide or keeper 23, secured to the end sill and arranged as clearly shown in Fig. 1.

It will be seen that the feed-trough is simple and comparatively inexpensive in construction, that it is adapted to be used for all purposes for which an ordinary feed or water trough may be employed, and that it will save time and labor in feeding animals and will effectually prevent the same from interfering with the operator. It will also be apparent that it will prevent animals from wasting feed or interfering with one another and that it will enable feed to be supplied from the exterior of the trough forming a permanent part of a pen, inclosure, or the like.

What is claimed is—

1. A device of the class described comprising a trough, and a pivoted shield approximately V-shaped in cross-section having sides arranged at an angle to each other, said shield being pivotally mounted above the trough and arranged to swing from one side to the other of the same and extending vertically from the side of the trough at which it is arranged, substantially as described.

2. A device of the class described comprising a trough, a frame or grating hinged to the trough and arranged to swing upward and downward, a pivoted shield mounted above the trough and arranged to swing from one side of the trough to the other, and a rod slidably connected with the frame or grating and carried by the shield, substantially as described.

3. A device of the class described comprising a trough, a pivoted shield, a hinged frame or grating provided with openings extending transversely of it, and rods slidable in the openings and connected with the shield, substantially as described.

4. A device of the class described comprising a trough, a shield mounted above the trough and arranged to move from one side to the other of the same, and means operable by foot for moving the shield from one side of the trough to the other and for controlling the drop of the same, substantially as described.

5. A device of the class described comprising a trough, a grating or frame hinged to one side of the trough, a pivotally-mounted shield connected with the frame or grating and provided with an arm, a foot-lever, and a rod or bar connecting the foot-lever with the arm, substantially as described.

In testimony that I claim the foregoing as my own I have hereto affixed my signature in the presence of two witnesses.

JAMES J. SMITH.

Witnesses:
 NORMAN DONLEY,
 RUTH E. DONLEY.